United States Patent
Steynberg et al.

(10) Patent No.: US 8,013,025 B2
(45) Date of Patent: *Sep. 6, 2011

(54) METHOD OF OPERATING A THREE-PHASE SLURRY REACTOR

(75) Inventors: Andre Peter Steynberg, Vanderbijlpark (ZA); Berhold Berend Breman, AG Zutphen (NL); Derk Willem Frederick Brilman, LS Delden (NL)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 818 days.

This patent is subject to a terminal disclaimer.

(21) Appl. No.: 11/908,916

(22) PCT Filed: Mar. 17, 2006

(86) PCT No.: PCT/IB2006/050836
§ 371 (c)(1),
(2), (4) Date: Sep. 17, 2007

(87) PCT Pub. No.: WO2006/097905
PCT Pub. Date: Sep. 21, 2006

(65) Prior Publication Data
US 2008/0114083 A1    May 15, 2008

(30) Foreign Application Priority Data
Mar. 17, 2005   (ZA) .................................. 2005/02264

(51) Int. Cl.
*C07C 27/00* (2006.01)

(52) U.S. Cl. ....................................... 518/700; 518/705

(58) Field of Classification Search .................. 518/700, 518/705
See application file for complete search history.

(56) References Cited

U.S. PATENT DOCUMENTS

| | | | |
|---|---|---|---|
| 2,853,369 A | 9/1958 | Kolbel | |
| 6,060,524 A | 5/2000 | Casanave et al. | |
| 6,375,921 B1 | 4/2002 | Eickhoff et al. | |
| 6,812,260 B2 | 11/2004 | Osora et al. | |
| 2002/0035163 A1 * | 3/2002 | Vogel et al. | 518/728 |

FOREIGN PATENT DOCUMENTS

| | | |
|---|---|---|
| WO | 02/096835 A2 * | 12/2002 |
| WO | 02/100981 A1 | 12/2002 |
| WO | 2004/101475 A1 | 11/2004 |
| WO | 2005/049194 A1 | 6/2005 |

* cited by examiner

*Primary Examiner* — Jafar Parsa
(74) *Attorney, Agent, or Firm* — Fitch, Even, Tabin & Flannery (57) ABSTRACT

A method of operating a three-phase slurry reactor includes feeding at a low level at least one gaseous reactant into a vertically extending slurry body of solid particles suspended in a suspension liquid, the slurry body being contained in a plurality of vertically extending horizontally spaced slurry channels inside a common reactor shell, the slurry channels being defined between vertically extending horizontally spaced divider walls or plates and each slurry channel having a height, width and breadth such that the height and breadth are much larger than the width. The gaseous reactant is allowed to react as it passes upwardly through the slurry body present in the slurry channels, thereby to form non-gaseous and/or gaseous product. Gaseous product and/or unreacted gaseous reactant is allowed to disengage from the slurry body in a head space above the slurry body.

26 Claims, 8 Drawing Sheets

METHOD OF OPERATING A THREE-PHASE SLURRY REACTOR

CROSS REFERENCE TO RELATED APPLICATIONS

This application is a 35 U.S.C. 371 application of International Patent Application No PCT/IB2006/050836 filed Mar. 17, 2006 claiming priority from ZA 2005/02264 filed Mar. 17, 2005.

THIS INVENTION relates to a method of operating a three-phase slurry reactor and to a three-phase slurry reactor.

BACKGROUND OF THE INVENTION

Considerable risk is encountered when technology is scaled up from pilot plant scale to commercial plant scale in order to reap the benefits of economy of scale. Three-phase slurry reactors typically exhibit scale-dependent macro-mixing effects and the aforementioned risk is thus applicable when three-phase slurry reactors are scaled up. It will thus be an advantage if a method can be found which can significantly reduce the risk associated with upscaling of three-phase slurry reactors. In addition, reactor designs in which the mixing patterns inside the reactor can be more readily modelled or predicted from experimentation have the benefit that the extent of usually undesirable back-mixing can be limited thereby potentially allowing an optimal combination of desirable plug-flow characteristics (usually good productivity and good selectivity) and well-mixed characteristics (often required for desirable solids distribution and even temperature profiles).

A solution that has been proposed is to create zones in the reactor that effectively mimic the behaviour of a reactor with a smaller characteristic diameter. In this manner the behaviour of the large scale reactor can be predicted to some extent, since it effectively consists of the sum of a number of smaller reactors of effectively pilot plant scale. However, one is still largely dependent on working within the bounds of the macro-mixing patterns that are established in the reactor with a smaller characteristic diameter. It would thus be an advantage if a method can be found that allows designers additional degrees of freedom to, at least to some extent, control the mixing patterns that are established in a three-phase slurry reactor.

Three-phase slurry reactors are commonly used for highly exothermic reactions due to their excellent heat removal characteristics. However, with the introduction of ever more active catalysts and more intensive use of reactor volume, even the heat removal ability of three-phase slurry reactors is being tested.

In light of what has been said before, it will thus be an advantage if a method can be found which significantly reduces the risk associated with upscaling of three-phase slurry reactors by allowing the designer additional degrees of freedom to exert some control over the mixing patterns in the reactor, while simultaneously increasing the heat removal ability of the reactor.

SUMMARY OF THE INVENTION

According to one aspect of the invention, there is provided a method of operating a three-phase slurry reactor, the method including feeding at a low level at least one gaseous reactant into a vertically extending slurry body of solid particles suspended in a suspension liquid, the slurry body being contained in a plurality of vertically extending horizontally spaced slurry channels inside a common reactor shell, the slurry channels being defined between vertically extending horizontally spaced divider walls or plates and each slurry channel having a height, width and breadth such that the height and breadth are much larger than the width;

allowing the gaseous reactant to react as it passes upwardly through the slurry body present in the slurry channels, thereby to form non-gaseous and/or gaseous product;

allowing gaseous product and/or unreacted gaseous reactant to disengage from the slurry body in a head space above the slurry body;

withdrawing gaseous product and/or unreacted gaseous reactant from the head space; and if necessary, maintaining the slurry body at a desired level by withdrawing slurry or suspension liquid, including non-gaseous product if present, or by adding slurry or suspension liquid.

The method may include allowing slurry to pass downwardly from a high level in the slurry body to a lower level thereof, using one or more downcomer zones or downcomers inside the reactor shell.

At least some of the slurry channels may be in slurry flow communication above upper ends of the slurry channels.

The divider walls or plates of at least some of the slurry channels may separate said slurry channels from adjacent heat transfer medium flow spaces. The method may include passing a heat transfer medium through the heat transfer medium flow spaces to exchange heat in indirect relationship with the slurry body present in the slurry channels.

Heat transfer surfaces of the reactor, such as those of the divider walls or plates, may optionally be shaped or textured to increase their heat transfer surface area or to improve heat transfer coefficients compared to those of smooth divider walls or plates. The shaping or texturing may include, amongst other methods known to persons skilled in the art, the use of dimpled, ribbed or finned walls or plates.

According to a second aspect of the invention, there is provided a method of operating a three-phase slurry reactor, the method including feeding at a low level at least one gaseous reactant into a vertically extending slurry body of solid particles suspended in a suspension liquid, the slurry body being contained in a plurality of vertically extending horizontally spaced slurry channels inside a common reactor shell, at least some of the slurry channels being in slurry flow communication above open upper ends of the slurry channels and at least some of the slurry channels being defined by walls separating the slurry channels from a heat transfer medium flow space or spaces;

allowing the gaseous reactant to react as it passes upwardly through the slurry body present in the slurry channels, thereby to form a non-gaseous and/or a gaseous product;

passing a heat transfer medium through the heat transfer medium flow space or spaces to exchange heat in indirect relationship with the slurry body present in the slurry channels;

allowing slurry to pass downwardly from a high level in the slurry body to a lower level thereof, using one or more downcomer zones or downcomers inside the reactor shell;

allowing gaseous product and/or unreacted gaseous reactant to disengage from the slurry body in a head space above the slurry body;

withdrawing gaseous product and/or unreacted gaseous reactant from the head space; and if necessary, maintaining the slurry body at a desired level by withdrawing slurry or suspension liquid, including non-gaseous product if present, or by adding slurry or suspension liquid.

The slurry channels are preferably isolated from each other between their open upper ends and open lower ends, and are preferably separated from each other by heat transfer medium flow spaces. In other words, the method preferably includes preventing slurry flow communication at all elevations between the open upper ends and lower ends of the slurry channels, so that the slurry channels are discrete, defining completely individualised reaction chambers.

The slurry channels used in the method according to the second aspect of the invention may be defined by vertically extending tubes between tube sheets, with the heat transfer medium flow space being defined between the tube sheets and surrounding the tubes. The tubes typically have diameters of at least about 10 cm.

Instead, the slurry channels may be defined by vertically extending horizontally spaced divider walls or plates, with heat transfer medium flow spaces also being defined between vertically extending horizontally spaced divider walls or plates, at least some of the slurry channels being separated from adjacent heat transfer medium flow spaces by common or shared divider walls or plates.

The divider walls or plates may be parallel to each other, defining slurry channels and heat transfer medium flow spaces with a height, width and breadth such that the height and breadth are typically much larger than the width. In other words, each divider wall has a height and a breadth which are substantial, a relatively small thickness and is spaced relatively closely from an adjacent divider wall, thereby defining vertically extending parallelipipedal channels or spaces with one dimension much smaller than the other two dimensions.

Heat transfer surfaces of the reactor, such as those of the divider walls or plates or tubes, may optionally be shaped or textured to increase their heat transfer surface area or to improve heat transfer coefficients compared to those of smooth divider walls or smooth cylindrical tubes. The shaping or texturing may include, amongst other methods known to persons skilled in the art, the use of dimpled, ribbed or finned walls or plates or tubes.

When the slurry channels are defined by divider walls, the slurry and heat transfer medium may be present in slurry channels and heat transfer medium flow spaces that are arranged alternately. Each slurry channel may thus be flanked by, or sandwiched between, two heat transfer medium flow spaces, except possibly for radially outer slurry channels.

The downward flow of slurry in the downcomer zones or downcomers may be sufficiently high that there is substantially no downward flow of slurry in the slurry channels.

While it is believed that the method can, at least in principle, have broader application, it is envisaged that the solid particles will normally be catalyst particles for catalysing the reaction of the gaseous reactant or gaseous reactants into a liquid product and/or a gaseous product. The suspension liquid will normally, but not necessarily always, be liquid product, with liquid phase or slurry thus being withdrawn from the slurry body to maintain the slurry body at a desired level.

Furthermore, while it is also believed that, in principle, the method can have broader application, it is envisaged that it will have particular application in hydrocarbon synthesis where the gaseous reactants are capable of reacting catalytically exothermically in the slurry body to form liquid hydrocarbon product and, optionally, gaseous hydrocarbon product. In particular, the reaction or hydrocarbon synthesis may be Fischer-Tropsch synthesis, with the gaseous reactants being in the form of a synthesis gas stream comprising mainly carbon monoxide and hydrogen, and with both liquid and gaseous hydrocarbon products being produced and the heat transfer medium being a cooling medium, e.g. boiler feed water.

For hydrocarbon synthesis, the slurry channels will typically have a height of at least 0.5 m, preferably at least 1 m, more preferably at least 2 m, but may even be 4 m or higher. The slurry channels will typically have a width of at least 2 cm, preferably at least 3.8 cm, more preferably at least 5 cm. The width of the slurry channels will typically not exceed 50 cm, more preferably the width will not exceed 25 cm, more preferably the width will not exceed 15 cm. The slurry channels will typically have a breadth in the range of approximately 0.2 m to 1 m. The reactor shell will typically have a diameter of at least 1 m, preferably at least 2.5 m, more preferably at least 5 m, but one should note that an object of the invention is to neutralise the effect of reactor diameter on the reactor behaviour.

As will be appreciated, each slurry channel, whether defined between divider walls or defined by a tube, functions independently from the reactor shell and can be configured to function to a large extent independently from other slurry channels. Design and testing of a single slurry channel or a small subgroup of slurry channels on a pilot scale is feasible, with scale-up to a commercial scale reactor comprising a plurality of the slurry channels then becoming quite easy and being less risky, provided scale-dependent macro-mixing effects are managed properly.

Furthermore, when downcomers or downcomer zones are employed with a sufficient downward slurry flow such that there is substantially no downward flow of slurry in the slurry channels, the establishment of a macro-mixing pattern, other than that dictated by the defined downflow and upflow zones, over the reactor is practically impossible.

The method may include cooling the gas from the head space to condense liquid product, e.g. liquid hydrocarbons and reaction water, separating the liquid product from the gases to provide a tail gas, and recycling at least some of the tail gas to the slurry body as a recycle gas stream.

Vertically extending, horizontally disposed reactor zones may be defined inside the reactor shell, where each horizontally disposed reactor zone includes a plurality of slurry channels and optionally one or more heat transfer medium flow spaces. The method may include preventing slurry flow communication between adjacent vertically extending, horizontally disposed reactor zones and at all elevations between upper and lower open ends of the slurry channels in a horizontally disposed reactor zone. This may be achieved, for example, by providing the horizontally disposed reactor zones with vertically extending side walls, or by arranging the divider walls in adjacent horizontally disposed reactor zones at perpendicular angles so that an end divider wall in one of the horizontally disposed reactor zones in effect forms a side wall for the adjacent horizontally disposed reactor zone.

The method may include containing the slurry body in vertically spaced reactor zones each including a plurality of slurry channels and optionally one or more heat transfer medium flow spaces. An intermediate slurry zone may be defined between vertically spaced reactor zones.

The method may include feeding at least one gaseous stream into an intermediate zone between two vertically spaced reactor zones. The gaseous stream may be a recycle gas stream. If desired, the gaseous stream may be fed such that a portion of the cross-sectional area of the reactor is not gassed with the gaseous stream.

One or more of the downcomer zones or downcomers may extend from at or above the open upper ends of the slurry channels, or slurry channels in an upper vertically spaced reactor zone, to at or below open lower ends of the slurry channels, or slurry channels in a bottom vertically spaced reactor zone.

Instead, one or more of the downcomer zones or downcomers may extend from at or above the open upper ends of the slurry channels of a vertically spaced reactor zone, to at or below open lower ends of the slurry channels of said vertically spaced reactor zone, often into an intermediate zone below said vertically spaced reactor zone. A lower or higher vertically spaced reactor zone may include a similar downcomer zone or downcomer, which may be staggered in plan view from the downcomer zone or downcomer in the vertically spaced reactor zone above or below, or which may be in register with the downcomer zone or downcomer in the vertically spaced reactor zone above or below.

If desired, a downcomer zone may include a heat transfer medium flow space or spaces, and/or a filter to separate solid particles from the suspension liquid.

Allowing slurry to pass downwardly in a downcomer zone or downcomer may include preventing or inhibiting gaseous reactant or reactants from entering the downcomer zone, e.g. by providing a baffle, and/or it may include degassing the slurry in the downcomer zone or downcomer, e.g. by providing a degasser at an upper end of the downcomer zone or downcomer.

The method may include allowing slurry flow communication between horizontally disposed reactor zones in one or more of the intermediate zones, and/or in the bottom of the reactor below the open lower ends of slurry channels.

The method may include limiting the axial mixing of the solid particles over the entire reactor length. This can be achieved through the selection of vertically spaced reaction zones and downcomers spanning the length of a single reaction zone.

According to a third aspect of the invention, there is provided a three-phase slurry reactor, the reactor including a reactor shell containing a plurality of vertically extending horizontally spaced slurry channels which, in use, will contain a slurry of solid particles suspended in a suspension liquid, the slurry channels being defined between vertically extending horizontally spaced divider walls or plates and each slurry channel having a height, width and breadth such that the height and breadth are much larger than the width;

a gas inlet in the reactor shell for introducing a gaseous reactant or gaseous reactants into the reactor; and a gas outlet in the shell for withdrawing gas from a head space in the shell above the slurry channels.

At least some of the divider walls or plates may define heat transfer medium flow spaces or channels. The heat transfer medium flow channels may also have a height, breadth and width such that the height and breadth are much larger than the width.

Heat transfer surfaces of the reactor, such as those of the divider walls or plates, may optionally be shaped or textured to increase their heat transfer surface area or to improve heat transfer coefficients. The shaping or texturing may include, amongst other methods known to persons skilled in the art, the use of dimpled, ribbed or finned walls or plates.

The channels may be as hereinbefore described.

The slurry channels are thus located in a slurry zone inside the reactor shell. The slurry zone may have a normal slurry level above open upper ends of the slurry channels so that at least some of the slurry channels may be in slurry flow communication above their open upper ends.

The reactor may include one or more downcomer zones or downcomers, in use through which slurry can pass from a high level in the slurry zone to a lower level thereof.

According to a fourth aspect of the invention, there is provided a three-phase slurry reactor, the reactor including a reactor shell containing a plurality of vertically extending horizontally spaced slurry channels which, in use, will contain a slurry of solid particles suspended in a suspension liquid, the slurry channels being located in a slurry zone inside the reactor shell which has a normal slurry level above open upper ends of the slurry channels so that at least some of the slurry channels are in slurry flow communication above their open ends;

a heat transfer medium flow space or spaces defined by walls of the slurry channels separating the slurry channels from the heat transfer medium flow space or spaces so that in use heat transfer in indirect heat transfer relationship can take place between slurry in the slurry channels and a heat transfer medium in the heat transfer medium flow space or spaces;

one or more downcomer zones or downcomers through which slurry can pass from a high level in the slurry zone to a lower level thereof;

a gas inlet in the reactor shell for introducing a gaseous reactant or gaseous reactants into the reactor;

a gas outlet in the shell for withdrawing gas from a head space in the shell above the slurry channels; and if necessary, a liquid inlet for adding or withdrawing slurry or suspension liquid to or from the reactor.

At least some of the slurry channels may be in slurry flow communication below open lower ends of the slurry channels. The slurry channels may have walls configured to prevent slurry flow from or into the slurry channels other than through open upper and lower ends of the slurry channels. In other words, the walls typically prevent radial or transverse slurry flow between slurry channels, so that the slurry channels are completely individualised reaction chambers.

The slurry channels in the reactor according to the fourth aspect of the invention may be defined by vertically extending tubes between tube sheets, with the heat transfer medium flow space being defined between the tubes sheets and surrounding the tubes. The tubes typically have diameters of at least about 10 cm.

Instead, the slurry channels may be defined by vertically extending horizontally spaced divider walls or plates, with the heat transfer medium flow spaces also being defined between vertically extending horizontally spaced divider walls or plates, at least some slurry channels being separated from adjacent heat transfer medium flow spaces by common or shared divider walls or plates.

The divider walls or plates may be parallel to each other, defining slurry channels and heat transfer medium flow spaces as hereinbefore described. Typically, the divider walls or plates correspond with chords of the circular cylindrical reactor shell, when seen in plan view.

When the slurry channels are defined by divider walls, the slurry channels and heat transfer medium flow spaces may be alternately arranged. Each slurry channel may thus be flanked by, or sandwiched between, two heat transfer medium flow spaces, except possibly for radially outer slurry channels.

Heat transfer surfaces of the reactor, such as those of the divider walls or plates or tubes, may optionally be shaped or textured to increase their heat transfer surface area or to improve heat transfer coefficients compared to those of smooth divider walls or smooth cylindrical tubes. The shaping or texturing may include, amongst other methods known to persons skilled in the art, the use of dimpled, ribbed or finned walls or plates or tubes.

The slurry channels, optionally together with one or more heat transfer medium flow spaces, may be grouped together in reactor modules or sub-reactors. Sub-reactors may be horizontally disposed across the cross-sectional area of the reactor shell. A sub-reactor may have vertically extending side walls separating it from an adjacent horizontally spaced sub-reactor. The vertically extending side wall may be configured to prevent slurry flow communication between adjacent horizontally disposed sub-reactors at all elevations between upper and lower open ends of the slurry channels of the adjacent horizontally disposed sub-reactors.

The slurry channels of horizontally disposed or horizontally spaced adjacent sub-reactors may each have a breadth axis, when the slurry channels are defined by divider walls or plates, with the breadth axes of the slurry channels of adjacent horizontally disposed sub-reactors being parallel. Instead, the breadth axes of adjacent horizontally disposed sub-reactors may be perpendicular. In such an embodiment, an end divider wall of a sub-reactor may thus form a side wall separating the sub-reactor from a horizontally disposed adjacent sub-reactor.

The reactor may include reactor modules or sub-reactors which are vertically spaced, with the open upper ends of the slurry channels of a lower sub-reactor or sub-reactors being below the open lower ends of the slurry channels of an upper sub-reactor or sub-reactors.

The reactor may include an intermediate zone between upper sub-reactor(s) and lower sub-reactor(s). The intermediate zone may be in flow communication with slurry channels of an upper sub-reactor or sub-reactors and with slurry channels of a lower sub-reactor or sub-reactors. In other words, transverse or horizontal flow or mixing of slurry in the intermediate zone may be allowed by having the intermediate zone free of barriers which would prevent transverse flow between open ends of slurry channels opening out into the intermediate zone.

The reactor may include a gas inlet into an intermediate zone between upper and lower sub-reactors. The gas inlet may be a recycle gas inlet. The gas inlet may be configured to introduce gas only into a portion of the cross-sectional area of the reactor shell. In other words, the gas inlet may be arranged in use to gas only a selected cross-sectional region of the reactor, e.g. only certain sub-reactors or certain slurry channels.

One or more downcomer zones or downcomers may extend from at or above the open upper ends of the slurry channels, or the slurry channels of an upper sub-reactor, to at or below open lower ends of the slurry channels, or slurry channels of a lower sub-reactor.

Instead, one or more of the downcomer zones or downcomers may extend from at or above the open upper ends of the slurry channels in a sub-reactor, to at or below open lower ends of the slurry channels of said sub-reactor, often into an intermediate zone below said sub-reactor. Downcomer zones or downcomers of vertically spaced sub-reactors may be staggered in plan view, or may be in register.

A downcomer or downcomer zone may be defined by slurry channels adapted to function as a downcomer or downcomer zone. Such an adapted slurry channel may have or may be associated with a gassing prevention device, e.g. a baffle, or it may have or it may be associated with a degasser at an upper end thereof.

A downcomer zone or downcomer may include a heat transfer medium flow space or spaces and/or it may include a filter to separate solid particles from suspension liquid.

The heat transfer medium flow spaces, when in the form of channels, are close-ended, and are provided with heat transfer medium inlet and outlet arrangements. The heat transfer medium inlet and outlet arrangements may open out into the channels through their closed ends, i.e. axially or vertically, or the heat transfer medium flow channels or spaces may be in flow communication transversely or horizontally, reminiscent of a plate heat exchanger in which every second flow space is in flow communication, whilst being sealed from intervening flow spaces.

BRIEF DESCRIPTION OF THE DRAWINGS

The invention will now be described, by way of example, with reference to the accompanying diagrammatic drawings, in which.

DETAILED DESCRIPTION OF THE INVENTION

Figure 1:
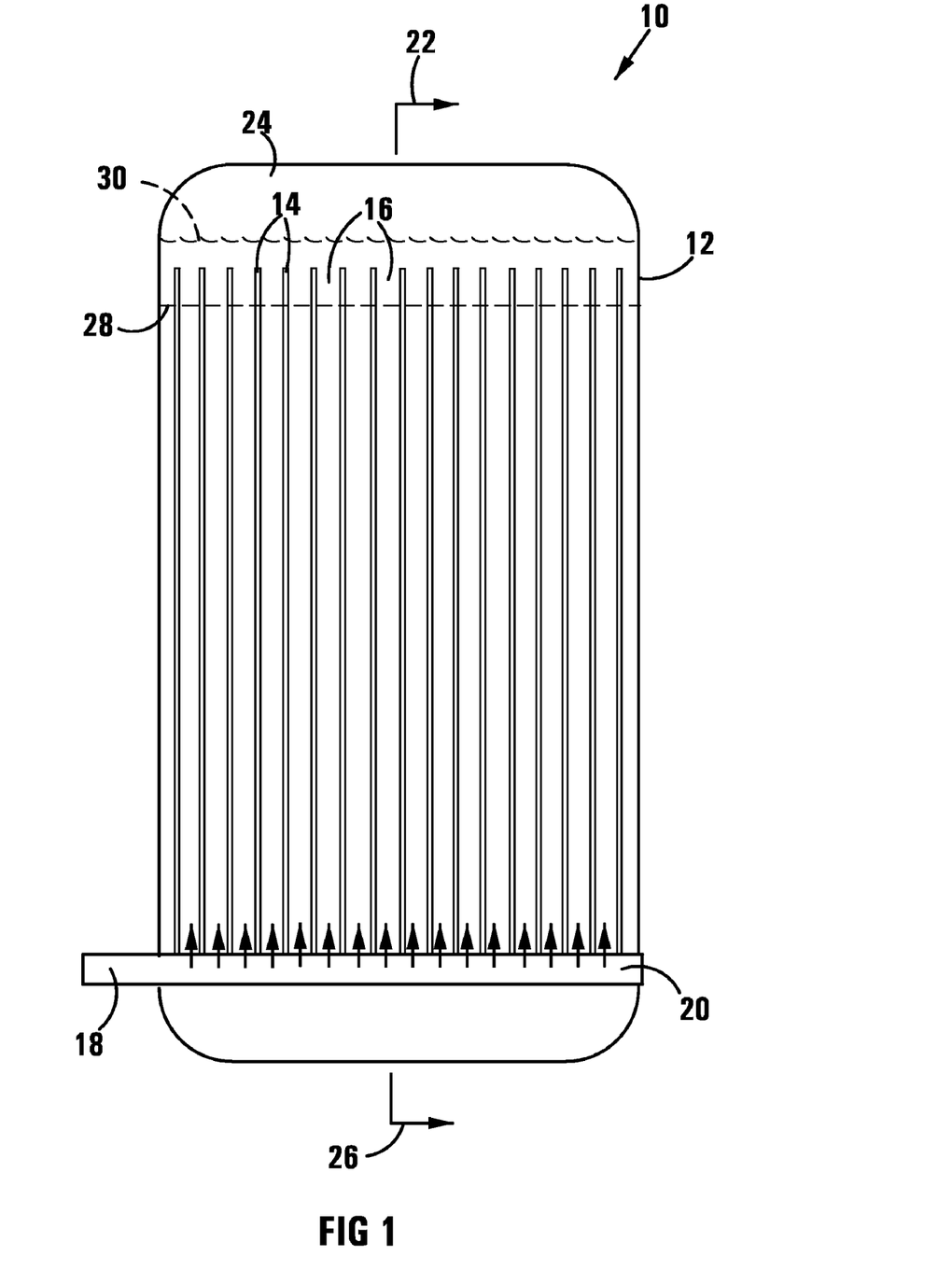
FIG. 1 shows a schematic sectional elevational view of one embodiment of a three-phase slurry reactor in accordance with the invention.

Referring to FIG. 1 of the drawings, reference numeral 10 generally indicates one embodiment of a three-phase slurry reactor in accordance with the invention. The reactor 10 includes a reactor shell 12 which houses a plurality of vertically extending, horizontally spaced parallel divider walls or plates 14. The plates 14 define a plurality of slurry channels 16.

The shell 12 is circular cylindrical and the plates 14 correspond with or fall on chords of the shell 12, when viewed in plan. Each slurry channel 16 has a relatively small width, i.e. the spacing between the plates 14, compared to its height and its breadth, where its breadth is taken along an axis perpendicular to the page on which the drawing is shown.

Although not shown in the drawings, at least some of the divider walls or plates 14 may be shaped or textured to increase their heat transfer surface area or to improve heat transfer coefficients. The shaping or texturing may include, amongst other methods known to persons skilled in the art, the use of dimpled, ribbed or finned walls or plates.

The reactor 10 also includes a gas inlet 18 leading into a sparger arrangement 20 below the slurry channels 16. A gas outlet 22 is provided which is in flow communication with a head space 24 above the slurry channels 16. A liquid outlet 26 leads from a bottom of the reactor 10, below the slurry channels 16, but can be at any convenient level.

The reactor 10 has a slurry zone extending from the bottom of the reactor 10 to a normal slurry level indicated by reference numerals 28 and 30. As can be seen in FIG. 1, the normal slurry level 28 can thus either be below the open upper ends of the slurry channels 16, or the normal slurry level 30 may be above the open upper ends of the slurry channels 16, thereby in use completely submerging the plates 14.

In a slurry reactor such as the reactor 10, there would be limited or substantially no interaction between the slurry channels 16 where they open out into the bottom of the reactor 10. Reaction spaces, defined by the slurry channels 16, are essentially two-dimensional and if the slurry channels are operated essentially independent of each other the dependency upon the diameter of the reactor shell 12 largely or completely disappears. This facilitates scale-up, as a representative unit, consisting of one or a few slurry channels, can be studied separately and independently from commercial scale reactor dimensions.

When the plates 14 are not fully submerged in the slurry body, i.e. when the normal slurry level is the level 28, the reactor 10 essentially behaves as a stack of parallel, vertically extending two-dimensional three-phase slurry columns. Differences between these two-dimensional columns and conventional three-dimensional columns, relating to mixing, gas hold-up and heat and mass transfer, may be used advantageously.

For fully submerged plates 14, when the normal slurry level is indicated by the level 30, even more opportunities present themselves. A slurry circulation flow pattern over the slurry channels 16 can be established, allowing for better plug flow characteristics for the phases in the slurry channels 16, a more uniform solids distribution throughout the slurry and higher heat transfer coefficients (reactors with heat transfer arrangements will be discussed in more detail later on).

Figure 2:
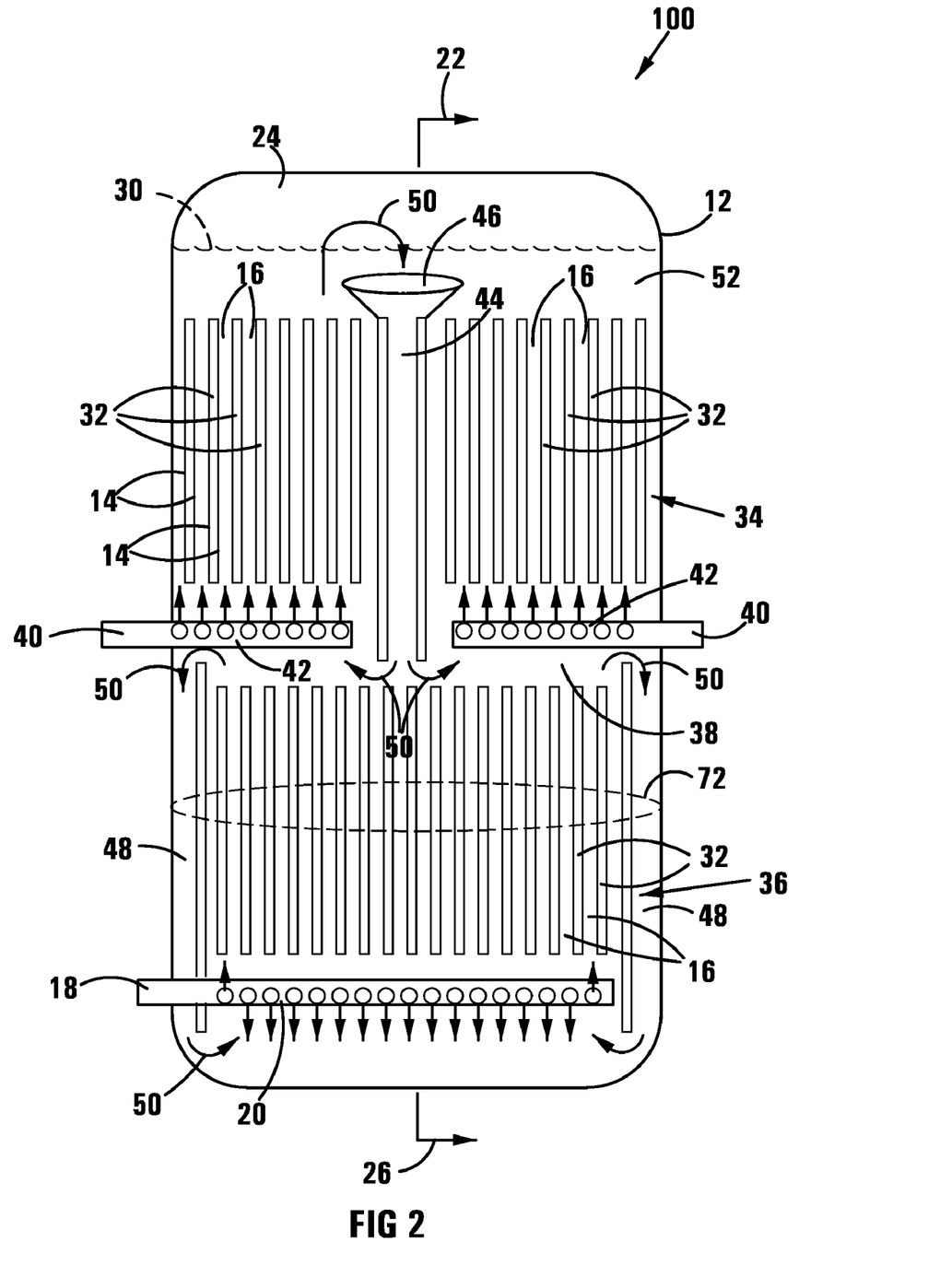
FIG. 2 shows a schematic sectional elevational view of another embodiment of a three-phase slurry reactor in accordance with the invention.

Referring to FIG. 2 of the drawings, reference numeral 100 generally indicates another embodiment of a three-phase slurry reactor in accordance with the invention. The reactor 100 is similar to the reactor 10 in many respects and the same reference numerals are thus used to indicate the same or similar parts or features, unless otherwise indicated. In the reactor 100, heat transfer medium channels 32 are also defined between some of the plates 14. The heat transfer medium channels 32 have closed lower ends and upper ends, but are in flow communication with each other at their ends and with heat transfer medium inlet and outlet arrangements (not shown). In use, heat transfer medium can thus be passed through the heat transfer medium channels 32, either upwardly or downwardly.

The slurry channels 16 and the heat transfer medium channels 32 are arranged alternately, so that each slurry channel 16 is flanked by or sandwiched between two heat transfer medium channels 32, except possibly for radially outer slurry channels 16, depending on the particular construction of the reactor 100.

In the reactor 100, the slurry channels 16 and the heat transfer medium channels 32 are grouped into an upper group, defining an upper plate bank or sub-reactor 34 and a lower group defining a lower plate bank or sub-reactor 36.

The upper sub-reactor 34 is vertically spaced from the lower sub-reactor 36 so that the open lower ends of the slurry channels 16 of the upper sub-reactor 34 are above the open upper ends of the slurry channels 16 of the lower sub-reactor 36. Between the upper sub-reactor 34 and the lower sub-reactor 36 an intermediate zone 38 is defined. A gas inlet, which is a recycle gas inlet and which is indicated by reference numeral 40 enters the intermediate zone 38 from two diagonally opposed sides of the reactor 100. Each recycle gas inlet 40 is associated with a sparger arrangement 42.

A downcomer 44 with a degasser 46 is provided centrally in the reactor shell 12 and extends from above the open upper ends of the slurry channel 16 of the upper sub-reactor 34 to below the open lower ends of the slurry channels 16 of the upper sub-reactor 34, i.e. into the intermediate zone 38. Between the reactor shell 12 and the plates 14 of the lower sub-reactor 36, an annular downcomer zone 48 is defined. As will be noticed, the sparger arrangements 42 are configured not to gas the downcomer 44 and the sparger arrangement 18 is configured not to gas the downcomer zone 48. As will be appreciated, the downcomer 44 is in effect staggered relative to the downcomer zone 48, ensuring a slurry recycle or redistribution flow as indicated by the arrows 50.

The reactor 100 in principle is suitable for many processes requiring a three-phase slurry reactor and requiring heat transfer to or from the slurry. However, only one use, namely hydrocarbon synthesis, will now be described.

In use, fresh synthesis gas comprising mainly carbon monoxide and hydrogen as gaseous reactants, is fed into the bottom of the reactor 100 through the gas inlet 18 and the sparger arrangement 20. By means of the sparger arrangement 20, the synthesis gas is uniformly distributed throughout the slurry present in the bottom of the reactor 100. Simultaneously, a recycle gas stream (typically cooled) comprising typically hydrogen, carbon monoxide, methane and carbon dioxide is returned to the reactor 100 through the recycle gas inlets 40 and the sparger arrangements 42. All of the recycle gas stream may be fed into the intermediate zone 38 by means of the recycle gas inlets 40 or, if desired, a portion of the recycle gas stream may be returned to the bottom of the reactor 100, by means of the gas inlet 18.

By means of the sparger arrangements 42, the slurry channels 16 of the upper sub-reactor 34 are specifically targeted with recycle gas, and the downcomer 44 is avoided. By using the recycle gas inlets 40, it is thus possible to allow a portion of the recycle gas to bypass the slurry located in the portion of the reactor 100 below the sparger arrangements 42. In this fashion, the overall gas hold-up in the reactor 100 can be reduced, thereby surprisingly increasing the reactor capacity.

The gaseous reactants, comprising the fresh synthesis gas and any recycle gas, pass upwardly through a slurry body 52 which occupies the slurry channels 16 of the upper and lower sub-reactors 34, 36 and which extends from the bottom of the reactor 100 to the level 30. The slurry body 52 comprises Fischer-Tropsch catalyst particles, typically an iron- or cobalt-based catalyst, suspended in liquid product (mostly wax). The slurry body 52 is controlled to have the slurry level 30 above the open upper ends of the slurry channels 16 of the upper sub-reactor 34 and above the degasser 46.

As the synthesis gas bubbles through the slurry body 52, the gaseous reactants therein react catalytically and exothermically to form liquid product, which thus forms part of the slurry body 52. From time to time, or continuously, slurry or liquid phase including liquid product is withdrawn through the liquid outlet 26, with the slurry level 30 thereby being controlled. The catalyst particles are separated from the liquid product in a suitable internal or external separation system, e.g. using filters (not shown). If the separation system is located externally to the reactor 100, an additional system (not shown) to return the separated catalyst particles to the reactor 100 is then provided.

The fresh synthesis feed gas and the recycle gas are introduced into the reactor 100 at a rate sufficient to agitate and suspend all of the catalyst particles inside the reactor 100 without settling. The gas flow rate will be selected depending on the slurry concentration, catalyst density, suspending medium density and viscosity, and particular particle size used. Suitable gas flow rates include, for example, from about 5 cm/s to about 50 cm/s. However, gas velocities up to about 85 cm/s have been tested in bubble columns. The use of higher velocities has the disadvantage that it is accompanied by a higher gas hold-up in the reactor leaving relatively less space to accommodate the catalyst-containing slurry. Whatever gas flow rate is however selected, it should be sufficient to avoid particle settling and agglomeration in the reactor 100.

Some slurry continuously passes downwardly through the downcomer 44 and the downcomer zone 48 as indicated by the arrows 50, thereby to achieve redistribution of catalyst particles within the slurry body 52 and to promote uniform heat redistribution throughout the slurry body 52. As will be appreciated, depending on the arrangement of the downcomers or downcomer zones, slurry redistribution over selected vertically extending regions of the reactor 100 is possible.

The reactor 100 is operated such that the slurry body 52 in the slurry channels 16 is in a heterogeneous or churn-turbulent flow regime and comprises a dilute phase consisting of fast-rising larger bubbles of gaseous reactants and gaseous product which traverse the slurry body 52 virtually in plug flow fashion and a dense phase which comprises liquid product, solid catalyst particles and entrained smaller bubbles of gaseous reactants and gaseous product. By means of the use of the slurry channels 16, the plug flow behaviour of the entire reactor 100 is promoted, since each slurry channel 16 has a high aspect ratio when height and width are considered, which is well in excess of the aspect ratio of the reactor shell 12.

Preferably, the downflow rate of slurry in downcomer zones 44 and 48 is sufficiently high, that there is substantially no downward flow of slurry in the slurry channels 16. In this manner, the establishment of a macro-mixing pattern other than downward in the downcomer zones 44 and 48 and upwards in the slurry channels 16 is largely precluded.

The slurry body 52 is present in alternate, open-ended, slurry channels 16 in the upper sub-reactor 34 and the lower sub-reactor 36. Boiler feed water as cooling medium is circulated through the closed-ended heat transfer medium channels 32 to remove the heat of the exothermic reactions. As will be appreciated, the plates 14 provide large heat transfer surface areas for removing heat from the slurry body 52 by means of indirect heat transfer to the boiler feed water.

Light hydrocarbon products, such as a $C_{20}$ and below fraction are withdrawn from the reactor 100 through the gas outlet 22 and passed to a separation unit (not shown). Typically, the separation unit comprises a series of coolers and a vapour-liquid separator and may optionally include further coolers and separators and possibly also a cryogenic unit for removal of hydrogen, carbon monoxide, methane and carbon dioxide from the $C_{20}$ and below hydrocarbon fraction. Other separation technologies such as membrane units, pressure swing adsorption units and/or units for the selective removal of carbon dioxide may be employed. The separated gases comprising nitrogen, carbon monoxide and other gases are compressed and recycled by means of a compressor (not shown) to provide the recycle gas stream. Condensed liquid hydrocarbons and reaction water are withdrawn from the separation unit for further working-up.

It is to be appreciated that, although the reactor 100, as illustrated, allows for the recycle of gas to the reactor 100, it is not necessarily so that a recycle gas stream will be employed in all embodiments.

As a result of the presence of the plates 14, no slurry flow communication is possible between the slurry channels 16, at all elevations between their open upper ends and their open lower ends. However, above the open upper ends of the slurry channels 16 of the upper sub-reactor 34, there is no restriction on the flow of slurry. Similarly, in the intermediate zone 38 and below the open lower ends of the slurry channels 16 of the lower sub-reactor 36 there is no restriction on the flow of slurry.

Figure 3:
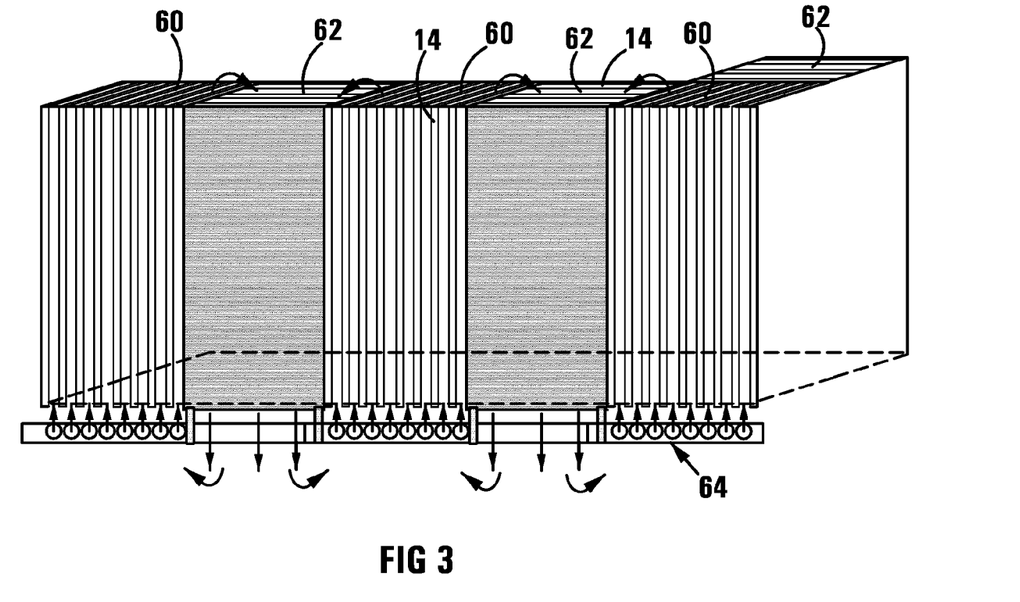
FIG. 3 shows a schematic three-dimensional view of some reactor modules or sub-reactors and downcomers or downcomer zones of a three-phase slurry reactor in accordance with the invention.
Figure 4:
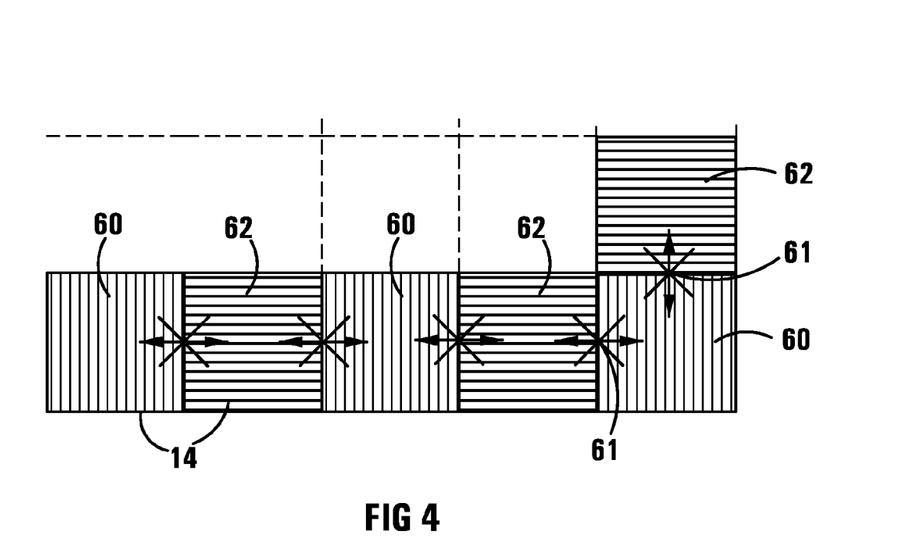
FIG. 4 shows a schematic top plan view of the reactor modules and downcomers of FIG. 3.

A three-phase slurry reactor in accordance with the invention may include a plurality of horizontally disposed reactor modules or sub-reactors, which will thus be at the same elevation inside the reactor shell 12 but disposed across the cross-sectional area of the reactor shell 12. In FIGS. 3 and 4, a few of these horizontally disposed reactor modules or sub-reactors or plate banks are shown and indicated by reference numeral 60. Associated with the sub-reactors 60, are downcomer zones indicated by reference numeral 62. A sparger arrangement 64 is provided below the sub-reactors 60 and downcomer zones 62.

As will be noted, the downcomer zones 62 also include a plurality of vertically extending divider walls or plates 14 in the same fashion as the sub-reactors 60. However, the sparger arrangement 64 does not gas the downcomer zones 62, allowing the zones 62 to function as downcomers and not as sub-reactors or risers.

Like the sub-reactors 60, the downcomer zones 62 have slurry channels and heat transfer medium channels which are alternately arranged.

In FIGS. 3 and 4, the height of the sub-reactors 60 and the downcomer zones 62 are shown as being equal. It is however to be appreciated that they can be different in height, width and channel breadth.

As indicated by the crossed arrows 61 in FIG. 4, there is no slurry exchange between the sub-reactors 60 or between the sub-reactors 60 and the downcomer zones 62, except above the open upper ends of the slurry channels and below the lower open ends of the slurry channels.

Figure 13:
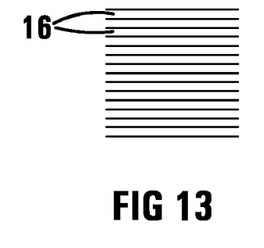
FIGS. 13 to 16 show schematic top plan views of various arrangements of divider walls of three-phase slurry reactors in accordance with the invention.
Figure 14:
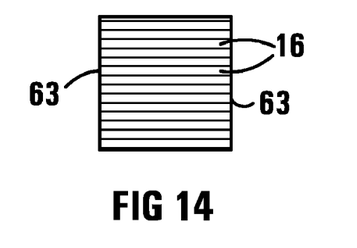

The parallel plates of a sub-reactor or plate bank may define channels 16 with open sides, as shown in FIG. 13, or the sub-reactors may have side walls 63 as shown in FIG. 14. When the sides of the channels 16 are closed by side walls 63, as shown in FIG. 14, there can be no interaction between the slurry in the channels 16 of one such sub-reactor with the slurry in the channels 16 of an adjacent sub-reactor, unless apertures are provided in the side walls 63. Naturally, side walls may enclose more than one sub-reactor or plate bank.

Figure 15:
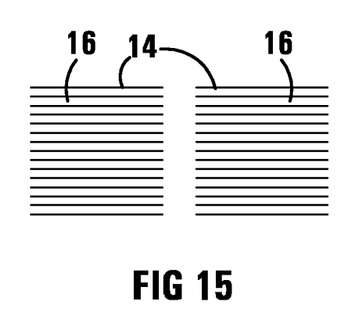
Figure 16:
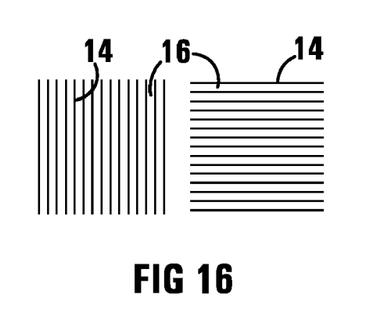

When two sub-reactors are arranged with their plates 14 parallel, as shown in FIG. 15, and in the absence of side walls, slurry in the channels 16 of one sub-reactor can interact with the slurry in the channels 16 of the adjacent sub-reactor. When the plates 14 of adjacent sub-reactors are perpendicular, as shown in FIG. 16, the end plate of one sub-reactor in effect defines a side wall, preventing interaction between slurry in the channels 16 of the two sub-reactors.

Figure 5:
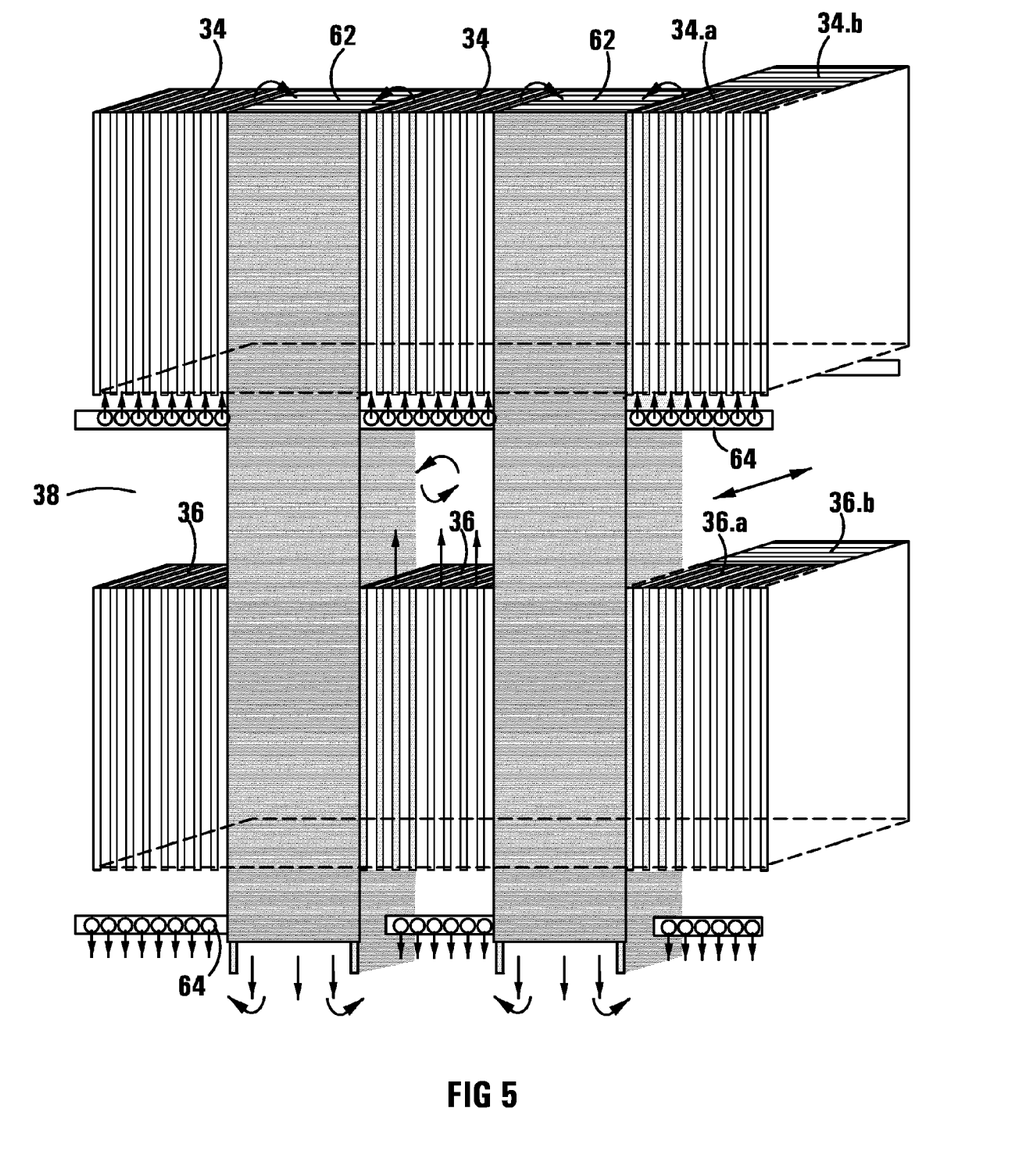
FIG. 5 shows a schematic three-dimensional view of some upper and lower reactor modules or sub-reactors and downcomers of a three-phase slurry reactor in accordance with the invention.

Referring to FIG. 5 of the drawings, upper sub-reactors 34 and lower sub-reactors 36 as well as two downcomers or downcomer zones 62 are shown. Two sparger arrangements 64, one below the upper sub-reactors 34 and one below the lower sub-reactors 36, are also shown. In the reactor layout shown in FIG. 5, the downcomers or downcomer zones 62 extend from the upper open ends of the slurry channels of the upper sub-reactors 34 through the intermediate zone 38 to below the open lower ends of the lower sub-reactors 36 and in fact to below the lower sparger arrangement 64. With this arrangement, large scale axial circulation of slurry in a known and controlled pattern can be achieved. It is also possible to allow for limited slurry exchange between adjacent sub-reactors 34.a and 34.b or 36.a and 36.b. As will be appreciated, the slurry channels can be designed to have a desired heat transfer surface area, hydraulic diameter, etc. If desired, additional gas sparging can be installed in between vertically spaced sub-reactors, in the intermediate zone 38 and internal filtration devices can be installed in the intermediate zone 38 or in one of the downcomers or downcomer zones 62. One advantage of placing internals such as filters in a downcomer or downcomer zone is the reduced gas hold-up and relatively high velocities encountered in a downcomer zone. By selecting the locations of the downcomers or downcomer zones 62 and placing them in particular positions on the cross-sectional area of the reactor shell 12, large scale slurry circulation can be severely influenced to achieve desired objects.

Downcomers or downcomer zones can be helpful in levelling the solids hold-up profile and temperature profile over the height of a three-phase slurry reactor. At the same time, however, they induce axial mixing, which sometimes may not be desirable. By design, the axial mixing can be promoted (resulting in a kind of riser-downcomer mode of operation) or it can be suppressed in order to promote plug flow characteristics for the reactor.

Figure 6:
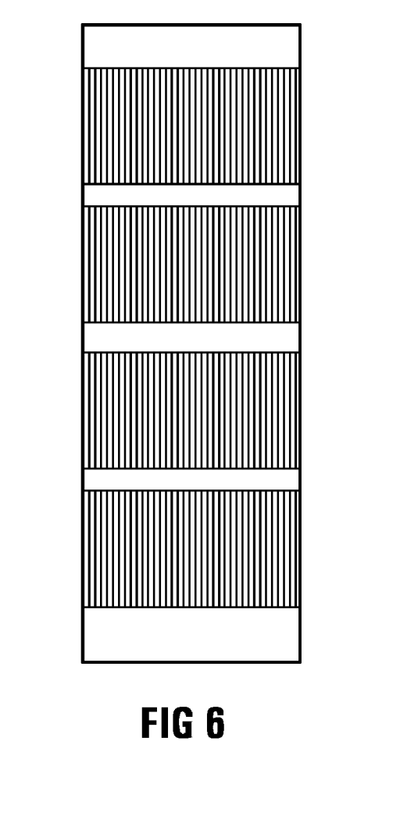
FIGS. 6 to 9 show schematic sectional elevational views of various embodiments of three-phase slurry reactors in accordance with the invention, with or without downcomers.
Figure 7:
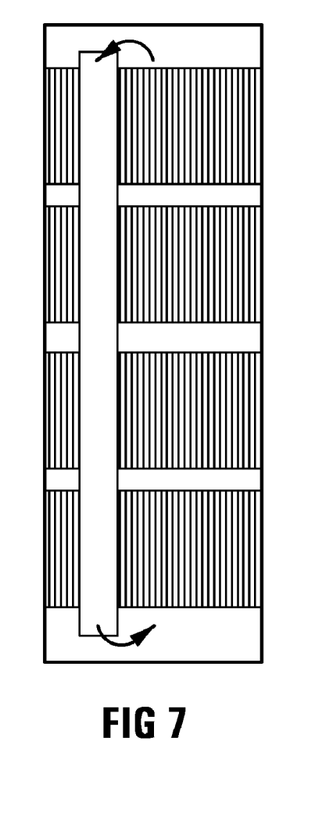
Figure 8:
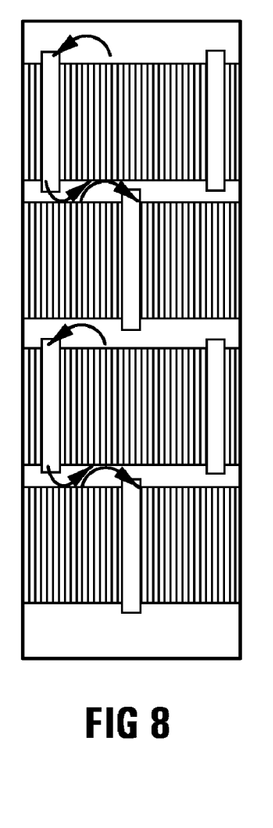
Figure 9:
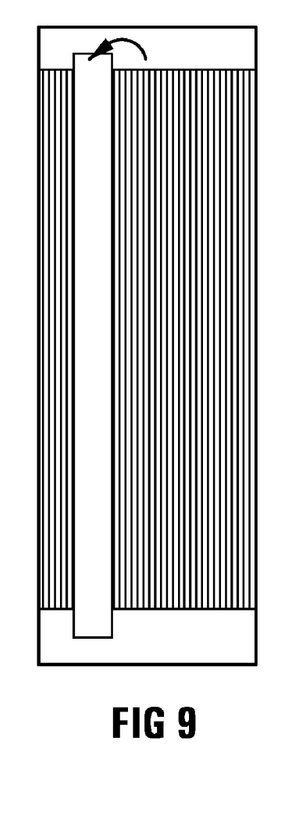

FIGS. 6 to 9 show various embodiments of three-phase slurry reactors in accordance with the invention, with various downcomer arrangements. In FIG. 6, the reactor has four vertically spaced sub-reactors or plate banks, with no downcomer. In FIG. 3, it is shown that a top to bottom downcomer, extending linearly axially through the sub-reactors or plate banks, can be employed. FIG. 8 illustrates how downcomers in each sub-reactor or plate bank can be arranged so that the downcomers, when viewed in plan, are staggered between upper and lower sub-reactors or plate banks. FIG. 9 illustrates a three-phase slurry reactor with divider walls or plates extending substantially the entire length of the reactor, from a bottom region to a head space region, with a single downcomer extending from the head space to the bottom region.

Figure 17:
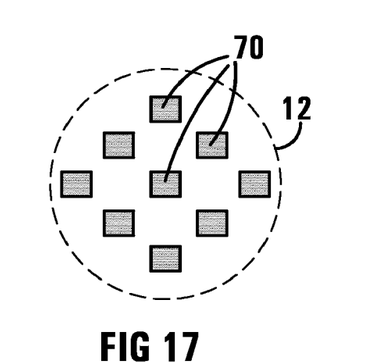
FIGS. 17 to 20 show schematic sectional plan views of various three-phase slurry reactors in accordance with the invention, illustrating various downcomer arrangements.
Figure 18:
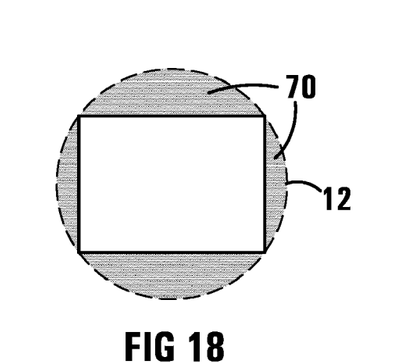
Figure 19:
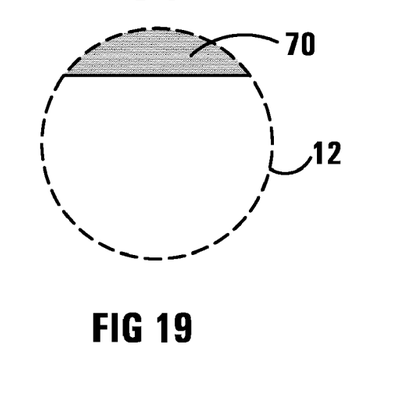
Figure 20:
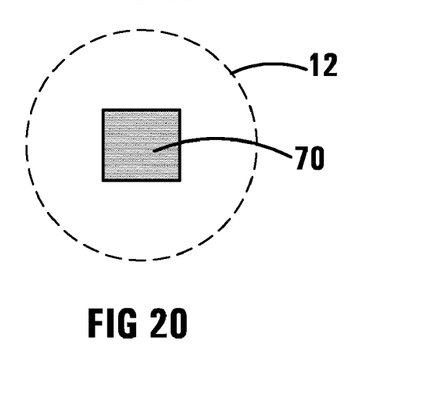

Various arrangements of downcomers or downcomer zones are shown in FIGS. 17 to 20 in which the downcomers or downcomer zones are indicated by reference numeral 70. In FIG. 17, the downcomer zones 70 are distributed across the cross-sectional area of the reactor shell 12. In FIG. 18, the downcomer zone 70 is adjacent the reactor shell 12, being roughly annular in plan view. The downcomer zone 70 in FIG. 19 is against one side of the reactor shell 12 and in FIG. 20, the downcomer zone 70 is centrally located.

By means of the arrangement selected for the sub-reactors and downcomer or downcomer zones, it is possible to allow or prevent slurry flow interaction between different upflow zones in the reactor (defined by the slurry channels), and to prevent or deny interaction between these upflow zones and downflow zones (defined by the downcomers or downcomer zones). Thus, in a reactor such as the reactor 100, at a particular elevation such as the elevation indicated by reference numeral 72 in FIG. 2, many configurations are possible, some of which are shown in FIGS. 21 to 28 of the drawings.

Figure 21:
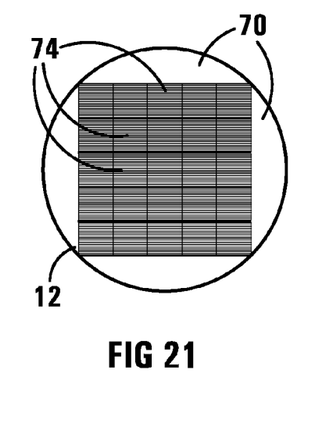
FIGS. 21 to 28 show schematic sectional plan views of various three-phase slurry reactors in accordance with the invention, illustrating various arrangements of horizontally disposed reactor modules or sub-reactors and downcomer zones.

In FIG. 21, the downflow zones 70 are against the sides of the reactor shell 12. Each sub-reactor, indicated by reference numeral 74 has side walls, thereby preventing slurry interaction between the sub-reactors 74, and between the sub-reactors 74 and the downflow zones 70.

Figure 22:
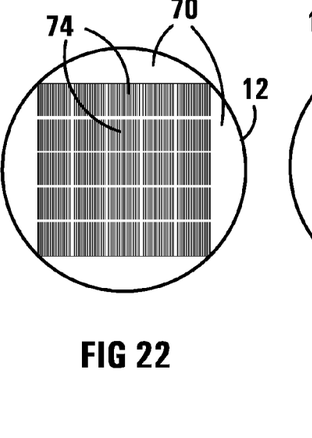
Figure 23:
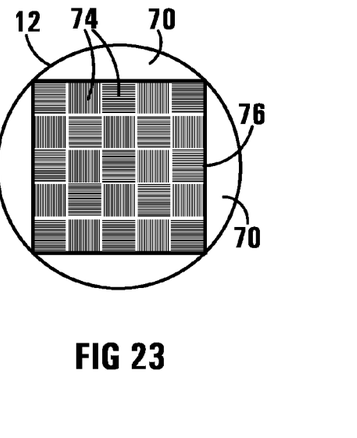

The sub-reactors 74 in FIG. 22 do not have side walls and the slurry channels of adjacent sub-reactors 74 are parallel. The slurry in these slurry channels can thus interact. In contrast, in FIG. 23, the slurry channels of adjacent sub-reactors 74 are arranged perpendicularly. The individual sub-reactors 74 do not have side walls, although the group of twenty-five sub-reactors has a side wall 76. The sub-reactors 74 are spaced slightly, allowing limited slurry interaction between adjacent sub-reactors 74 but with the perpendicular arrangement of the plates preventing a more free slurry interaction between adjacent sub-reactors 74. No slurry interaction is allowed between the upflow zones, i.e. the sub-reactors 74 and the downcomer zones 70.

Figure 24:
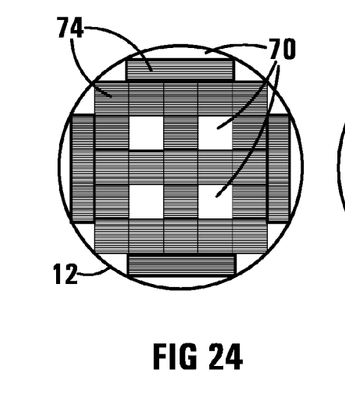
Figure 25:
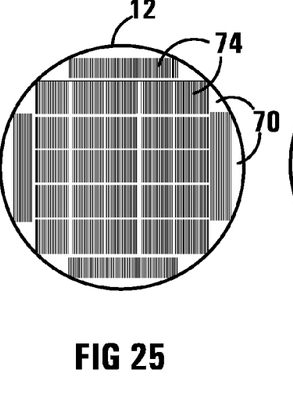
Figure 26:
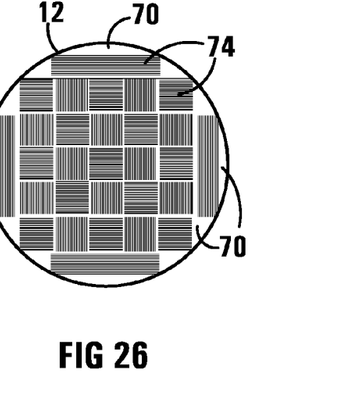

In FIG. 24, the sub-reactors 74 are all provided with side walls and the downcomer zones 70 are distributed. There is thus no slurry interaction between the sub-reactors 74, or between the sub-reactors 74 and the downcomer zones 70. In contrast, in FIG. 25, the sub-reactors 74 do not have side walls and the downcomer zones 70 are only adjacent the shell 12. Substantial slurry interaction between the sub-reactors 74, and between the sub-reactors 74 and the downcomer zones 70 can take place. In FIG. 26, the sub-reactors 74 are again without side walls, but many are arranged with their slurry channels perpendicular to the slurry channels of adjacent sub-reactors 74. Although there will thus be some interaction between adjacent sub-reactors 74 and between the sub-reactors 74 and the downcomer zones 70, the slurry interaction will be more limited than in the case of the reactor shown in FIG. 25.

Figure 27:
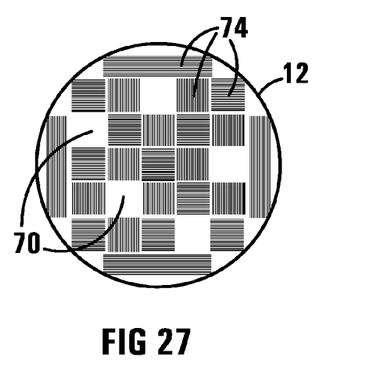

FIG. 27 shows a reactor similar to the reactor shown in FIG. 26, but in the case of the reactor of FIG. 27, the downcomer zones 70 are disposed across the cross-sectional area of the reactor.

Figure 28:
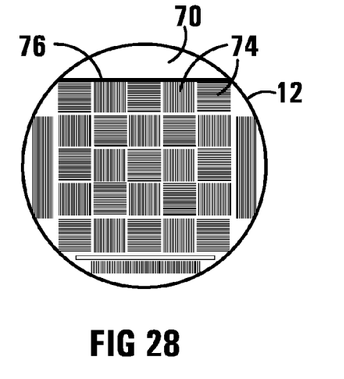

In FIG. 28, the downcomer zone 70 is located against one side of the reactor shell 12. There is limited slurry interaction between the sub-reactors 74 as a result of the slight spacing between the sub-reactors 74, although they are arranged at perpendicular angles. A barrier or side wall 76 substantially prevents slurry interaction between the slurry in the sub-reactors 74 and the slurry in the downcomer zone 70.

Figure 10:
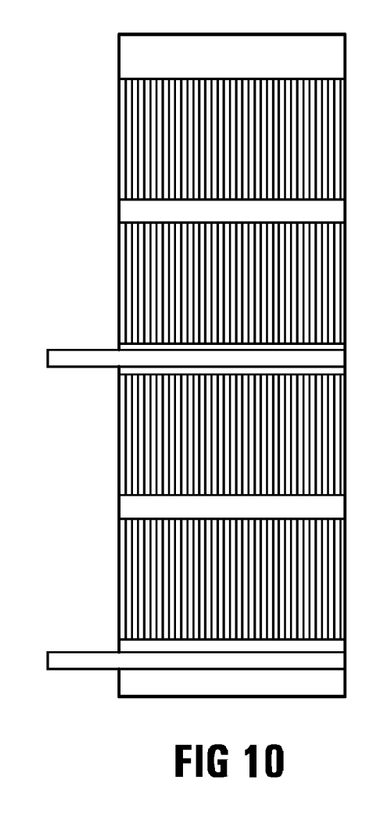
FIGS. 10 to 12 show schematic sectional elevational views of various embodiments of three-phase slurry reactors in accordance with the invention, with stage introduction of gas and various downcomer arrangements.
Figure 11:
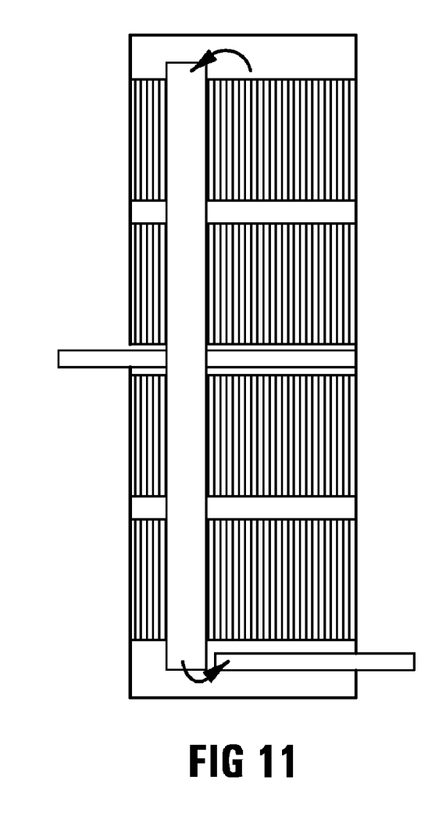
Figure 12:
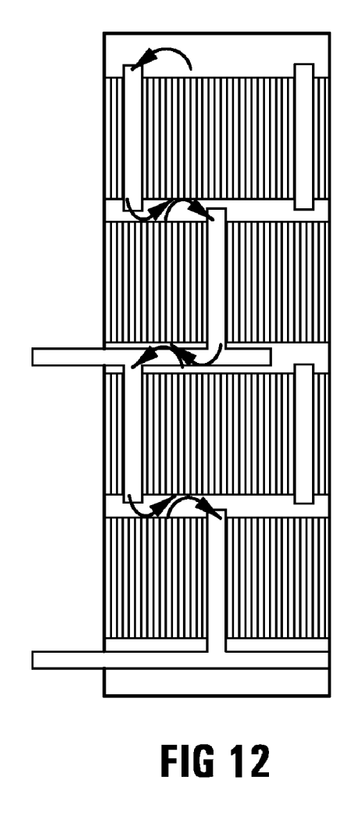

Various gas sparging strategies are shown in FIGS. 10 to 12. In FIG. 10, the gas is introduced in two stages, a portion of the gas entering a bottom region of the reactor and another portion of the gas entering an intermediate zone between two sub-reactors or plate banks. In FIGS. 11 and 12, the gas spargers are shown in combination with downcomers or downcomer zones. As can be clearly seen, it is possible to gas only a portion of the cross-sectional area of the reactor, in both the bottom and in the intermediate zones.

The method and apparatus of the present invention therefore allow for much reduced risk when upscaling slurry flow reactor designs, since the formation of macro-scale mixing patterns are largely prevented by the presence of slurry channels. In addition, and especially for designs including downcomers or downcomer zones, the reaction zone consists of a number of slurry channels in which a known upward superficial liquid flow rate and a known upward superficial gas velocity exist. These slurry channels are amenable to piloting and modelling, giving the designer a greater degree of control over the large scale reactor mixing patterns. Furthermore, the slurry channels are formed by heat exchanger surfaces. This leads to much improved heat removal ability for these designs over standard designs in which serpentine cooling coils are employed. Not only is the available heat removal surface area increased, but also more uniformly spread over the reactor.

The invention claimed is:

1. A method of operating a three-phase slurry reactor, the method including
feeding at a low level through a shell of the reactor at least one gaseous reactant into a vertically extending slurry body of solid particles suspended in a suspension liquid, the slurry body being contained in a plurality of vertically extending horizontally spaced slurry channels inside said reactor shell which is a common reactor shell, the slurry channels being defined between vertically extending horizontally spaced divider walls or plates and each slurry channel having a height, width and breadth such that the height and breadth are much larger than the width, the slurry body extending continuously from a bottom thereof to a normal slurry level below a head space so that bubbles traverse the continuous slurry body from where the gaseous reactant is introduced to the normal slurry level;
allowing the gaseous reactant to react as it passes upwardly through the slurry body present in the slurry channels, thereby to form non-gaseous and/or gaseous product;
allowing gaseous product and/or unreacted gaseous reactant to disengage from the slurry body in said head space above the slurry body;
withdrawing gaseous product and/or unreacted gaseous reactant from the head space; and
maintaining the slurry body at a desired level by withdrawing slurry or suspension liquid, including any non-gaseous product, or by adding slurry or suspension liquid.

2. The method as claimed in claim 1, in which at least some of the slurry channels are in slurry flow communication above upper ends of the slurry channels.

3. The method as claimed in claim 1, in which the divider walls or plates of at least some of the slurry channels separate said slurry channels from adjacent heat transfer medium flow spaces, the method including passing a heat transfer medium through the heat transfer medium flow spaces to exchange heat in indirect relationship with the slurry body present in the slurry channels.

4. The method as claimed in claim 1, in which the solid particles are catalyst particles for catalysing the reaction of the gaseous reactant or gaseous reactants into a liquid product and/or a gaseous product, and in which the suspension liquid includes any liquid product.

5. The method as claimed in claim 4, in which the reaction is Fischer-Tropsch hydrocarbon synthesis.

6. The method as claimed in claim 5, in which the slurry channels have a height of at least 0.5 m and a width in the range of 2 cm to 50 cm.

7. The method as claimed in claim 6, in which the slurry channels have a breadth in the range of 0.2 m to 1 m.

8. The method as claimed in claim 6, in which the reactor shell has a diameter of at least 1 m.

9. The method as claimed in claim 1, in which vertically extending, horizontally disposed reactor zones are defined inside the reactor shell, where each horizontally disposed reactor zone includes a plurality of slurry channels and optionally one or more heat transfer medium flow spaces, the method including preventing slurry flow communication between adjacent vertically extending, horizontally disposed reactor zones and at all elevations between upper and lower open ends of the slurry channels in a horizontally disposed reactor zone.

10. The method as claimed in claim 9, in which horizontally disposed reactor zones are defined by arranging the divider walls or plates in adjacent horizontally disposed reactor zones at perpendicular angles so that an end divider wall or plate in one of the horizontally disposed reactor zones in effect forms a side wall for the adjacent horizontally disposed reactor zone.

11. The method as claimed in claim 1, which includes containing the slurry body in vertically spaced reactor zones each including a plurality of slurry channels and optionally one or more heat transfer medium flow spaces, an intermediate slurry zone being defined between said vertically spaced reactor zones.

12. A method of operating a three-phase slurry reactor, the method including
feeding at a low level through a shell of the reactor at least one gaseous reactant into a vertically extending slurry body of solid particles suspended in a suspension liquid, the slurry body being contained in a plurality of vertically extending horizontally spaced slurry channels inside said reactor shell which is a common reactor shell, at least some of the slurry channels being in slurry flow communication above open upper ends of the slurry channels and at least some of the slurry channels being defined by walls separating the slurry channels from a heat transfer medium flow space or spaces, the slurry body extending continuously from a bottom thereof to a normal slurry level below a head space so that bubbles traverse the continuous slurry body from where the gaseous reactant is introduced to the normal slurry level in plug flow fashion;
allowing the gaseous reactant to react as it passes upwardly through the slurry body present in the slurry channels, thereby to form a non-gaseous and/or a gaseous product;
passing a heat transfer medium through the heat transfer medium flow space or spaces to exchange heat in indirect relationship with the slurry body present in the slurry channels;
allowing slurry to pass downwardly from a high level in the slurry body to a lower level thereof, using one or more downcomer zones or downcomers inside the reactor shell;
allowing gaseous product and/or unreacted gaseous reactant to disengage from the slurry body in said head space above the slurry body;
withdrawing gaseous product and/or unreacted gaseous reactant from the head space; and
maintaining the slurry body at a desired level by withdrawing slurry or suspension liquid, including any non-gaseous product, or by adding slurry or suspension liquid.

13. The method as claimed in claim 12, in which at least some of the slurry channels are in slurry flow communication below open lower ends of the slurry channels, the method including preventing slurry flow communication at all elevations between the open upper ends and open lower ends of the slurry channels.

14. The method as claimed in claim 12, in which the slurry channels are defined by vertically extending tubes between tube sheets, with the heat transfer medium flow space being defined between the tube sheets and surrounding the tubes.

15. The method as claimed in claim 12, in which the slurry channels are defined by vertically extending horizontally spaced divider walls or plates, with heat transfer medium flow spaces also being defined between vertically extending horizontally spaced divider walls or plates, and with at least some of the slurry channels being separated from adjacent heat transfer medium flow spaces by common or shared divider walls or plates and in which at least some of the divider walls or plates are parallel to each other, defining slurry channels and heat transfer medium flow spaces with a height, width and breadth such that the height and breadth are much larger than the width.

16. The method as claimed in claim 12, in which the downward flow of slurry in the downcomer zones or downcomers is sufficiently high that there is substantially no downward flow of slurry in the slurry channels.

17. The method as claimed in claim 12, in which the solid particles are catalyst particles for catalysing the reaction of the gaseous reactant or gaseous reactants into a liquid product and/or a gaseous product, and in which the suspension liquid includes any liquid product.

18. The method as claimed in claim 17, in which the reaction is Fischer-Tropsch hydrocarbon synthesis.

19. The method as claimed in claim 18, in which the slurry channels have a height of at least 0.5 m, the slurry channels being defined by horizontally spaced divider walls or plates, and the slurry channels having a width in the range of 2 cm to 50 cm.

20. The method as claimed in claim 19, in which the slurry channels have a breadth in the range of 0.2 m to 1 m.

21. The method as claimed in claim 19, in which the reactor shell has a diameter of at least 1 m.

22. The method as claimed in claim 12, in which vertically extending, horizontally disposed reactor zones are defined inside the reactor shell, where each horizontally disposed reactor zone includes a plurality of slurry channels and optionally one or more heat transfer medium flow spaces, the method including preventing slurry flow communication between adjacent vertically extending, horizontally disposed reactor zones and at all elevations between upper and lower open ends of the slurry channels in a horizontally disposed reactor zone.

23. The method as claimed in claim 22, in which the slurry channels have a height of at least 0.5 m, the slurry channels being defined by horizontally spaced divider walls or plates, the slurry channels having a width in the range of 2 cm to 50 cm, and the slurry channels have a breadth in the range of 0.2 m to 1 m.

24. The method as claimed in claim 22, in which slurry channels are defined by horizontally spaced divider walls or plates, and in which horizontally disposed reactor zones are defined by arranging the divider walls or plates in adjacent horizontally disposed reactor zones at perpendicular angles so that an end divider wall or plate in one of the horizontally disposed reactor zones in effect forms a side wall for the adjacent horizontally disposed reactor zone.

25. The method as claimed in claim 12, which includes containing the slurry body in vertically spaced reactor zones each including a plurality of slurry channels and optionally one or more heat transfer medium flow spaces, an intermediate slurry zone being defined between said vertically spaced reactor zones.

26. The method as claimed in claim 25, in which one or more of the downcomer zones or downcomers extend from at or above the open upper ends of the slurry channels, or slurry channels in an upper vertically spaced reactor zone, to at or below open lower ends of the slurry channels, or slurry channels in a bottom vertically spaced reactor zone, and/or in which one or more of the downcomer zones or downcomers extend from at or above the open upper ends of the slurry channels of a reactor zone, to at or below open lower ends of the slurry channels of said reactor zone.

* * * * *